United States Patent [19]

Saunders et al.

[11] 4,219,575

[45] Aug. 26, 1980

[54] POTATO SEGMENT AND PROCESS FOR PREPARING FROZEN FRENCH FRIED POTATOES SUITABLE FOR MICROWAVE REHEATING

[75] Inventors: Francis R. Saunders, Lake Oswego; Richard L. McLaughlin, Aloha, both of Oreg.

[73] Assignee: Amfac Foods, Inc., Portland, Oreg.

[21] Appl. No.: 960,166

[22] Filed: Nov. 13, 1978

[51] Int. Cl.$^2$ .......................... A23L 1/216; A23L 3/32
[52] U.S. Cl. .................................... 426/242; 426/512; 426/518; 426/637; 426/243; 426/438; 426/441
[58] Field of Search ............... 426/241, 242, 243, 262, 426/271, 321, 327, 637, 661, 383, 438, 441, 481, 482, 483, 509, 510, 512, 518, 524

[56] References Cited

U.S. PATENT DOCUMENTS

| | | | |
|---|---|---|---|
| 3,391,005 | 7/1968 | Babigan | 426/637 X |
| 3,397,993 | 8/1968 | Strong | 426/441 X |
| 3,597,227 | 8/1971 | Murray et al. | 426/637 X |
| 3,643,721 | 2/1972 | Haubner | 426/518 X |
| 3,649,305 | 3/1972 | Wilder | 426/262 X |
| 4,007,292 | 2/1977 | Shatila et al. | 426/637 |
| 4,082,855 | 4/1978 | Citti et al. | 426/637 X |
| 4,109,020 | 8/1978 | Gorfien et al. | 426/637 X |

*Primary Examiner*—Arthur L. Corbin
*Attorney, Agent, or Firm*—Klarquist, Sparkman, Campbell, Leigh, Hall & Whinston

[57] ABSTRACT

A potato segment and a process for preparing frozen french fried potatoes suitable for microwave reheating. The potato segment has an undulating side surface configuration of particular dimensions which is adapted for microwave reheating. The potato segments are blanched, fried, and then frozen. When reheated with microwave energy, the potato segments resemble in quality, color, texture, flavor and odor, french fried potatoes prepared directly from fresh potatoes.

15 Claims, 6 Drawing Figures

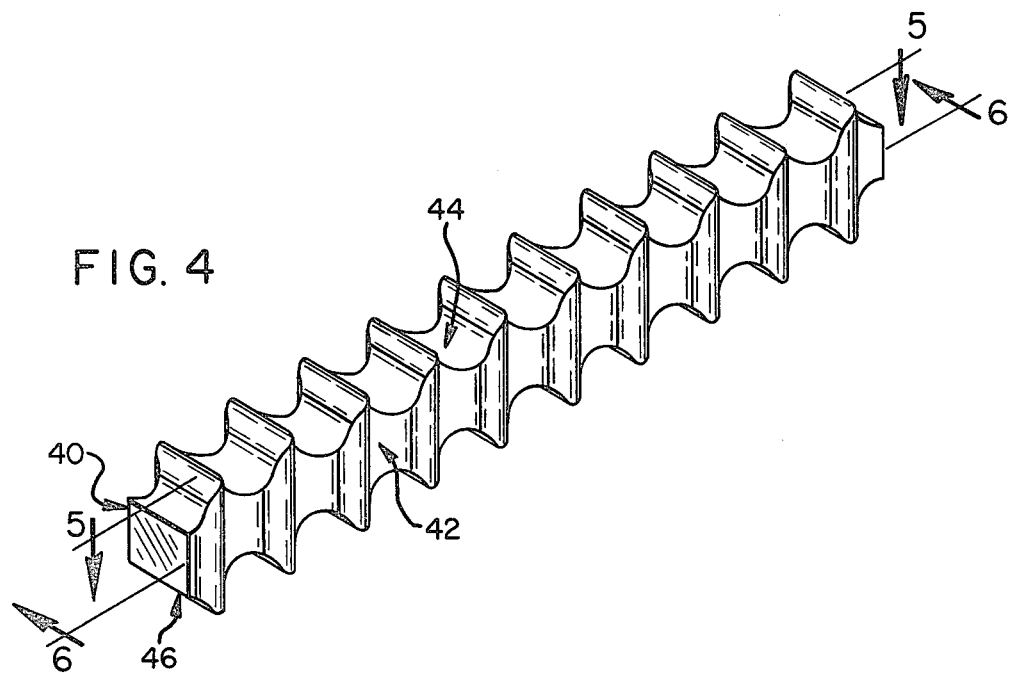
FIG. 4
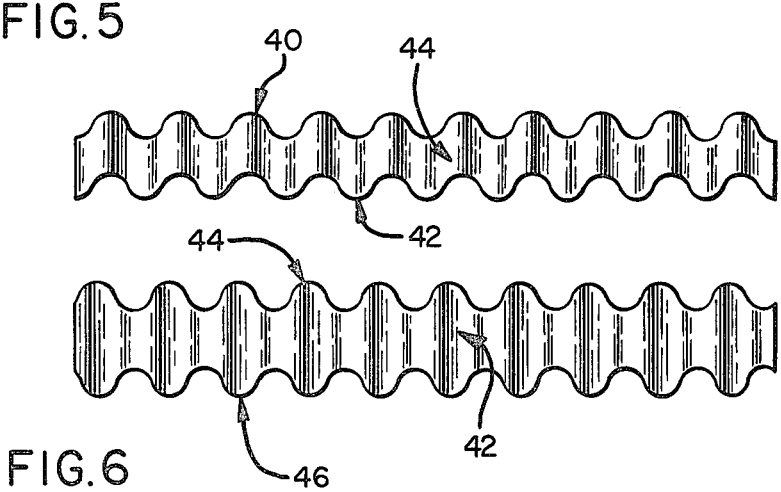
FIG. 5
FIG. 6

POTATO SEGMENT AND PROCESS FOR PREPARING FROZEN FRENCH FRIED POTATOES SUITABLE FOR MICROWAVE REHEATING

BACKGROUND OF THE INVENTION

The present invention relates generally to the preparation of french fried potatoes, and more particularly to a potato segment and process for preparing frozen french fried potatoes suitable for microwave reheating.

The use of partially fried, frozen potato segments suitable for finish frying into french fried potatoes is steadily increasing since the process is economical and efficient and permits the retailer to market a relatively standard product. U.S. Pat. Nos. 3,397,993 and 3,649,305 disclose processes for preparing frozen potato segments which when finish fried resemble french fried potatoes prepared directly from fresh potatoes.

The widespread use of microwave ovens in homes, restaurants and vending machine facilities has enabled individuals to prepare hot food quickly and easily. However, heretofore potato segments which have been reheated in a microwave oven have been too greasy, soggy, dry or tough, etc. to be palatable. This is due to the difference in cooking action achieved by the use of deep frying or regular oven heating versus microwave oven heating. With the former, the potato segments are subjected to surface heating. With the latter, the potato segments are heated internally and moisture migrates from their interiors to their surfaces. This moisture must dissipate from the surfaces of the potato segments in the proper manner and amount for the resulting french fried potatoes to have a good texture. Good texture is represented by a well-cooked, mealy interior with a crisp, rigid exterior which is not tough or soggy. Neither limp, oil-soaked potato segments nor those showing hard cores are representative of good texture.

Potato segment configurations heretofore known are not suitable for microwave cooking or reheating. They include the standard strip cut, the V-shaped or saw tooth cut, and various cuts having undulating side surfaces. A regular crinkle cut potato segment has undulating side surfaces. The side surfaces of each opposing pair are generally parallel. In its uncooked state, the amplitude of its undulations is approximately one-sixteenth inch. Its cross-section is one-quarter inch square. U.S. Pat. No. 3,643,721 discloses another potato segment having undulating side surfaces. In its uncooked state, the amplitude of its undulations equals or exceeds one-eighth inch. The side surfaces of one opposing pair are parallel, while the side surfaces of the other opposing pair are aligned so that the hills on one side surface oppose corresponding hills of the other side surface. In its uncooked state, the distance between opposing hill tops and valley bottoms of the opposing side surfaces of one opposing pair is one-half inch and the distance between opposing hill tops of the opposing side surfaces of the other opposing pair is five-eighths inch.

SUMMARY OF THE INVENTION

The present invention provides a potato segment and a process for preparing frozen french fried potatoes suitable for microwave reheating. The potato segment has a generally rectangular cross-section and first and second pairs of undulating opposing side surfaces. The amplitude of the undulations is about one-eighth inch. The side surfaces of the first opposing pair are parallel while the side surfaces of the second opposing pair are aligned so that the respective hills oppose each other. When the potato segment is in its uncooked state, the hill top to valley bottom distance between the side surfaces of the first pair is one-quarter inch, and the hill top to hill top distance between the side surfaces of the second pair is one-half inch. The potato segment has an average of ten undulations per three inches of length in its uncooked state.

Potato segments with the above configuration and dimensions are blanched, fried and then frozen. When reheated with microwave energy, the potato segments resemble in quality, color, texture, flavor and odor, french fried potatoes prepared directly from fresh potatoes.

BRIEF DESCRIPTION OF THE DRAWINGS

FIG. 4 shows an enlarged isometric view of a second embodiment of the potato segment of the present invention;

FIG. 5 shows an elevational view of the potato segment of FIG. 4 taken along line 5—5 of FIG. 4 and drawn to a smaller scale; and FIG. 6 shows an elevational view of the potato segment of FIG. 4 taken along line 6—6 of FIG. 4 and drawn to a smaller scale.

DESCRIPTION OF THE PREFERRED EMBODIMENTS

In accordance with the present invention, potatoes are held in storage under conventional, accepted conditions, so as not to accumulate excessive amounts of sugar therein. Potatoes of the Russet Burbank variety which meet a seasonal average of twenty-one percent raw solids (specific gravity of 1.081) are preferred. The potatoes are cleaned and peeled, using abrasion, steam, lye, or some other technique well known in the art. Preferably caustic soda (sodium hydroxide) is used to peel the potatoes.

After being peeled, the potatoes are inspected and trimmed of any defects, and then cut into individual potato segments. The potato segments may be cut using a URSCHELL GRL cutter fitted with CONCERTINA blades set to cut the potato segments to the configuration and dimensions hereinafter described in greater detail.

Figure 1:
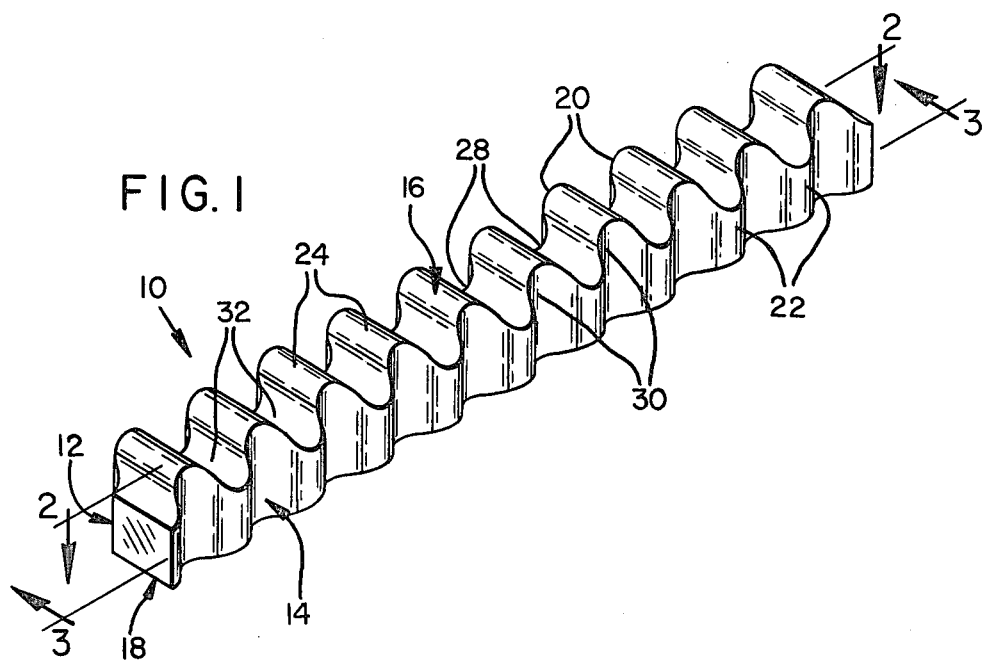
FIG. 1 shows an enlarged isometric view of a first embodiment of the potato segment of the present invention.
Figure 2:
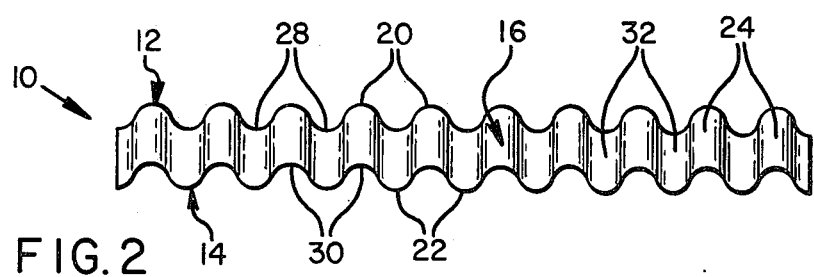
FIG. 2 is an elevational view of the potato segment of FIG. 1 taken along line 2—2 of FIG. 1 and drawn to a smaller scale.
Figure 3:
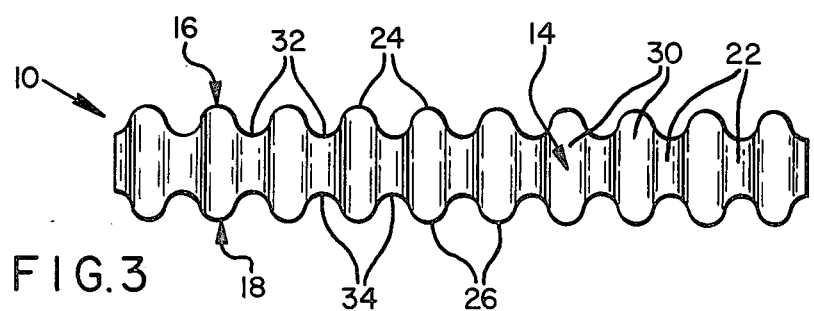
FIG. 3 is an elevational view of the potato segment of FIG. 1 taken on line 3—3 of FIG. 1 and drawn to a smaller scale.

Referring to FIGS. 1–3, a first embodiment of the potato segment of the present invention comprises an elongate body 10 having a generally rectangular cross-section, a first pair of generally opposing undulating side surfaces 12 and 14, and a second pair of generally opposing undulating side surfaces 16 and 18. Each of these side surfaces 12, 14, 16 and 18 has an alternating sequence of laterally extending, rounded hills 20, 22, 24 and 26, respectively, and valleys 28, 30, 32 and 34, respectively, of uniform dimensions. The amplitude of the undulations, e.g., the relative height difference between the tops of the hills and the bottoms of the valleys on the same side surface is about one-eighth inch.

Referring to FIG. 2, the side surfaces 12 and 14 of the first opposing pair are parallel, that is, the hills 20 of side surface 12 oppose corresponding valleys 30 of the side surface 14. Referring to FIG. 3, the side surfaces 16 and 18 of the second opposing pair are aligned so that the hills 24 of the side surface 16 oppose corresponding hills 26 of the side surface 18. As shown in FIGS. 1-3, the first pair of opposing side surfaces 12 and 14 are longitudinally aligned with respect to the second pair of opposing side surfaces 16 and 18 so that the hill tops and valley bottoms of adjacent side surfaces coincide.

When the potato segment is in its raw or uncooked state, the hill top to valley bottom distance between the side surfaces 12 and 14 is one-quarter inch, and the hill top to hill top distance between the side surfaces 16 and 18 is one-half inch. To facilitate packaging, the elongate body 10 preferably has a length no greater than three inches. Thus, the overall dimensions of the potato segment are three inches by three-eighths inch by one-half inch. The potato segment has an average of ten hills or undulations for three inches of length in its uncooked state.

FIGS. 4-6 depict a second embodiment of the potato segment of the present invention which is similar in all respects (including dimensions) to the first embodiment except that the first pair of opposing side surfaces 40 and 42 is longitudinally offset with respect to the second pair of opposing side surfaces 44 and 46 by three-sixteenths inch when the potato segment is raw. The amount of offset can be varied if desired. This potato segment presents the appearance of having its hills and valleys running substantially continuously there around. The aesthetic appeal of the potato segment is thus greatly enhanced.

The potato segments of the first and second embodiments are identically processed. They are inspected for internal defects, such as hollow hearts. Slivers and short pieces are removed, using shuffaloes and shakers. The potato segments are sprayed with fresh water to wash off free external starch.

The potato segments are steam or hot water blanched to gelatinize the starch granules in the potato cells in the shortest time possible so as not to leach the potato flavor. If the concentration of reducing sugars is too high, the blanch time can be extended. The blanching is done for about forty-five seconds to about five minutes at a temperature of from about 160° F. to about 212° F. Preferably the potato segments are blanched for two minutes at a temperature of about 170° F.

During the blanching, or immediately afterwards, additives may be incorporated into the potato segments. Modified food starch may be used as needed to increase the crispness of the finished fries, and sodium acid pyrophosphate (SAPP), a chelating agent, may be used to prevent the strips from becoming grey. Preferably the concentration of SAPP in solution should not exceed one percent. Dextrose (corn sugar) may be used to effect a golden color upon frying. Preferably no artificial coloring or flavoring agents are incorporated into the potato segments.

Next, the potato segments are fried for a time sufficient to remove moisture and develop the texture required of the finished product. The frying time will vary depending upon the solids content of the raw potatoes. In accordance with the invention the segments are fried sufficiently long so that their oil solids content after frying is from about sixteen percent to about twenty percent by weight. After frying the percentage of oil solids in the fried potato segments may have to be reduced below this range in order to prevent the potato segments from sticking together when reheated with microwave energy. This may be accomplished by freezing the fried potato segments in liquid Freon which will cause some of the oil to be extracted. However, it is preferable that the oil solids content be at least ten percent after extraction.

The percentage of oil solids in the frozen potato segments of the present invention differs considerably from that of commercially available potato segments adapted for finish frying. The latter are partially fried initially so that in their frozen state their oil solids content is from about three and one-half percent to about eight and one-half percent by weight, and after finish frying it is from about twelve percent to about eighteen percent by weight, depending on the size of the cut.

In any case, the potato segments of the present invention are fried for a time sufficient to completely cook them. Soybean, cottonseed, palm, or combinations of these oils may be used for frying. The potato segments of the present invention are preferably fried by immersing them in a bath of refined beef tallow oleo stock or a blend of beef tallow and vegetable oil for about two to five minutes at a temperature of from about 340° F. to about 370° F.

The fried potato segments are blast frozen to an internal temperature preferably not above 0° F. They may be frozen by immersing them in liquid Freon. Slivers and short pieces are screened out and a final inspection is made prior to packaging. The packaged potato segments are stored and shipped at a temperature of about 0° F. or below.

The processing of the potato segments should be controlled so that after freezing the potato segments have a total solids content (including oil solids and potato solids) of from about fifty-six percent to about sixty-four percent, and preferably of from about fifty-eight percent to about sixty-two percent by weight. This can be accomplished by varying the frying time and temperature. By controlling the solids content of the frozen potato segments in this manner, the finished, reheated potato segments will have the desired texture and will not be unduly greasy or soggy.

When the consumer, such as an individual purchasing a package of the frozen potato segments from a vending machine, is ready to use the potato segments, he need merely place the package inside a microwave oven for a short time, e.g. one minute at 1,000 watts. The potato segments which are completely cooked during the frying step, are reheated in the microwave oven to serving temperature. Alternatively, the potato segments may be reheated in a conventional oven for about six to seven minutes at about 400° F. to 425° F. or deep fried from the frozen state a second time for about thirty seconds.

The undulations on the side surfaces of the potato segments permit the hill tops to be fried crisp. During microwave reheating, the large surface area of the potato segments permits rapid loss of moisture. About one minute after the potato segments have been taken out of the microwave oven and removed from the package, a sufficient amount of moisture has dissipated from the hill tops so that they are crisp, while a sufficient amount of moisture has been retained in the remainder of the potato segments so that their interiors are mealy. The resulting french fried potatoes have an acceptable texture. After microwave reheating, the potato segments have an average of eight hills for every two inches of length. It has been found that the previously described potato segments, when processed as described, resemble in quality, color, texture, flavor and odor, french fried potatoes prepared directly from fresh potatoes.

EXAMPLE 1

A quantity of Russet Burbank potatoes having a specific gravity of 1.078 was cleaned, peeled, trimmed of defects and cut into potato segments of the second embodiment. The potato segments were blanched for two minutes at a temperature of 170° F. SAPP was added to prevent discoloration and dextrose was added to effect a golden color upon frying. The potato segments were fried in an oil bath for four minutes at 350° F. Thereafter, the potato segments were blast frozen to an internal temperature of 0° F. and stored. After five months, two-ounce samples were reheated in a microwave oven for the minute at 1,000 watts. The finished product was excellent overall, resembling in quality, color, texture, flavor and odor, french fried potatoes prepared directly from fresh potatoes.

EXAMPLE 2

A quantity of Russet Burbank potatoes having a specific gravity of 1.079 was cleaned, trimmed of defects and cut into potato segments of the second embodiment. The potato segments were blanched for two minutes at 170° F. SAPP was added to prevent discoloration and dextrose was added to effect a golden color upon frying. The potato segments were fried in an oil bath for four minutes and fifteen seconds at 360° F. Thereafter, the potato segments were blast frozen to an internal temperature of 0° F. and stored. After two months, two-ounce samples were reheated in a microwave oven for one minute at 1,000 watts. The finished product was good, although not as good as that of Example 1.

EXAMPLE 3

A quantity of Russet Burbank potatoes having a specific gravity of 1.078 was cleaned, peeled, trimmed of defects and cut into potato segments of the second embodiment. The potato segments were blanched for two minutes at 170° F. SAPP was added to prevent discoloration and dextrose was added to effect a golden color upon frying. The potato segments were fried in an oil bath for four minutes at 350° F. Thereafter, the potato segments were blast frozen to an internal temperature of 0° F. and stored. After five days, two-ounce samples were reheated in a microwave oven for one minute at 1,000 watts. The finished product was good, although not as good as that of Example 1.

EXAMPLE 4

A quantity of Hermiston Russet potatoes having a specific gravity of 1.078 was cleaned, peeled, trimmed of defects and cut into potato segments of the first embodiment. The potato segments were blanched for two minutes at a temperature of 170° F. SAPP was added to prevent discoloration and dextrose was added to effect a golden color upon frying. The potato segments were fried in an oil bath for four minutes at 350° F. Thereafter, the potato segments were blast-frozen. Two-ounce samples were reheated in a microwave oven for one minute at 1,000 watts. The finished product was equivalent to that of Example 1.

A number of tests were run to determine the optimum configuration and dimensions for a potato segment intended to be reheated from a frozen state in a microwave oven. Commercially available, frozen, prefried potato segments were experimented with including the five-sixteenth inch square straight cut, the five-sixteenths inch square regular crinkle cut, the one-half inch square regular crinkle cut, the three-sixteenths inch square straight cut, the one-quarter inch square saw tooth cut, and the one-quarter inch square regular crinkle cut. Potato segments like those disclosed in U.S. Pat. No. 3,643,721, having a one-half inch square cross-section, were also tried. Quantities of these different types of potato segments were blanched and fried for various time periods at various temperatures and then frozen. When reheated in a microwave oven, none of the finished products was satisfactory primarily because of soggy texture. The product prepared in accordance with the present invention was superior overall.

Having described preferred embodiments of the invention, it will be apparent that the invention permits of modification in arrangement and detail.

What is claimed is:

1. Frozen french fried potatoes suitable for reheating with microwave energy,
    each potato being in the form of an elongate body having a generally rectangular cross-section and first and second pairs of generally opposing side surfaces, each side surface having an alternating sequence of laterally extending, rounded hills and valleys of substantially uniform dimensions,
    each of said hills having a top and each of said valleys having a bottom,
    each hill of one side surface of said first pair opposing a corresponding valley of the other side surface of said first pair,
    each hill of one side surface of said second pair opposing a corresponding hill of the other side surface of said second pair,
    the distance between the top of a hill of one side surface of said first pair and the bottom of its corresponding opposing valley of the other side surface of said first pair being one-quarter inch,
    and the distance between the top of a hill of one side surface of said second pair and the top of its corresponding opposing hill of the other side surface of said second pair being one-half inch; and
    each potato having a total solids content of from about fifty-six percent to about sixty-four percent by weight;
    whereby said potatoes, when reheated from their frozen state with microwave energy, resemble in quality, color, texture, flavor, and odor, french fried potatoes prepared directly from fresh potatoes.

2. The product of claim 1 wherein each potato has a total solids content of from about fifty-eight percent to about sixty-two percent by weight.

3. The product of claim 1 wherein each potato has an oil solids content of at least ten percent by weight.

4. A process for preparing frozen french fried potatoes suitable for reheating with microwave energy wherein raw potatoes are first peeled and trimmed, comprising the steps of:
    cutting the raw potatoes into segments, each in the form of an elongate body having a generally rectangular cross-section and first and second pairs of generally opposing side surfaces, each side surface having an alternating sequence of laterally extending, rounded hills and valleys of substantially uniform dimensions, each of said hills having a top and each of said valleys having a bottom, each hill of one side surface of said first pair opposing a corresponding valley of the other side surface of said first pair, each hill of one side surface of said second pair opposing a corresponding hill of the other side surface of said second pair, the distance between the top of a hill of one side surface of said first pair and the bottom of its corresponding opposing valley of the other side surface of said first pair being one-quarter inch, and the distance between the top of a hill of one side surface of said second pair and the top of its corresponding opposing hill of the other side surface of said second pair being one-half inch;

blanching said raw potato segments; and frying and thereafter freezing said blanched potato segments so that their total solids content after freezing is of from about fifty-six percent to about sixty-four percent by weight;

whereby said potato segments, when reheated from their frozen state with microwave energy, resemble in quality, color, texture, flavor, and odor, french fried potatoes prepared directly from fresh potatoes.

5. The process of claim 4 wherein said potato segments are fried and thereafter frozen so that after freezing their total solids content is of from about fifty-eight percent to about sixty-two percent by weight.

6. The proccess of claim 4 wherein said potato segments are fried and thereafter frozen so that after freezing their oil solids content is at least ten percent by weight.

7. The process of claim 4 and further comprising the step of reheating said frozen potato segments with microwave energy.

8. The process of claim 4 wherein said potato segments are cut so that the relative difference in height between the tops of the hills and the bottoms of the valleys on the same side surface is about one-eighth inch when said potato segments are raw.

9. The process of claim 4 wherein said potato segments are cut so that the frequency of said hills is about ten per three inches of length when said potato segments are raw.

10. The process of claim 4 wherein said potato segments are blanched for about forty-five seconds to about five minutes at a temperature of from about 160° F. to about 212° F.

11. The process of claim 4 wherein said potato segments are blanched for about two minutes at a temperature of about 170° F.

12. The process of claim 4 wherein said potato segments are fried by immersing said segments for about two to five minutes in an oil bath at a temperature of from about 340° F. to about 370° F.

13. The process of claim 4 wherein said potato segments are frozen by cooling said segments to a temperature of 0° F. or below.

14. Frozen french fried potatoes suitable for reheating with microwave energy, each potato being in the form of an elongate body having a generally rectangular cross-section and first and second pairs of generally opposing side surfaces, each side surface having an alternating sequence of laterally extending, rounded hills and valleys of substantially uniform dimensions, each of said hills having a top and each of said valleys having a bottom, each hill of one side surface of said first pair opposing a corresponding valley of the other side surface of said first pair, each hill of one side surface of said second pair opposing a corresponding hill of the other side surface of said second pair, the distance between the top of a hill of one side surface of said first pair and the bottom of its corresponding opposing valley of the other side surface of said first pair being one-quarter inch, the distance between the top of a hill of one side surface of said second pair and the top of its corresponding opposing hill of the other side surface of said second pair being one-half inch, the relative difference in height between the tops of the hills and the bottoms of the valleys on the same side surface being one-eighth inch, and the frequency of said hills being about ten per three inches of length;

each potato having a total solids content of from about fifty-eight percent to about sixty-two percent by weight;

whereby said potatoes, when reheated from their frozen state with microwave energy, resemble in quality, color, texture, flavor, and odor, french fried potatoes prepared directly from fresh potatoes.

15. A process for preparing frozen french fried potatoes suitable for reheating with microwave energy wherein raw potatoes are first peeled and trimmed, comprising the steps of:

cutting the raw potatoes into segments, each in the form of an elongate body having a generally rectangular cross-section and first and second pairs of generally opposing side surfaces, each side surface having an alternating sequence of laterally extending, rounded hills and valleys of substantially uniform dimensions, each of said hills having a top and each of said valleys having a bottom, each hill of one side surface of said first pair opposing a corresponding valley of the other side surface of said first pair, each hill of one side surface of said second pair opposing a corresponding hill of the other side surface of said second pair, the distance between the top of a hill of one side surface of said first pair and the bottom of its corresponding opposing valley of the other side surface of said first pair being one-quarter inch, the distance between the top of a hill of one side surface of said second pair and the top of its corresponding opposing hill of the other side surface of said second pair being one-half inch, the relative difference in height between the tops of the hills and the bottoms of the valleys on the same side surface being about one-eighth inch, and the frequency of said hills being about ten per three inches of length;

blanching said raw potato segments for about two minutes at a temperature of about 170° F.; and frying said blanched potato segments by immersing said segments for about two to five minutes in an oil bath at a temperature of from about 340° F. to about 370° F. and thereafter freezing said fried potato segments by cooling said segments to a temperature of 0° F. or below so that after freezing, the total solids contents of said potato segments is of from about fifty-eight percent to about sixty-two percent by weight;

whereby said potato segments, when reheated from their frozen state with microwave energy, resemble in quality, color, texture, flavor, and odor, french fried potatoes prepared directly from fresh potatoes.

* * * * *